(12) United States Patent
Abend

(10) Patent No.: US 6,593,435 B2
(45) Date of Patent: *Jul. 15, 2003

(54) METHOD FOR PRODUCING AND USING STORAGE-STABLE, LATENT-REACTIVE LAYERS OR POWDERS OF SURFACE-DEACTIVATED, SOLID POLYISOCYANATES AND DISPERSION POLYMERS WITH FUNCTIONAL GROUPS

(75) Inventor: Thomas Abend, St. Gallen (CH)

(73) Assignee: Bayer AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/076,606

(22) Filed: Feb. 19, 2002

(65) Prior Publication Data

US 2002/0193534 A1 Dec. 19, 2002

Related U.S. Application Data

(63) Continuation of application No. 09/581,139, filed on Jun. 9, 2000, now Pat. No. 6,348,548.

(30) Foreign Application Priority Data

Dec. 11, 1997 (EP) .............................................. 97810969

(51) Int. Cl.⁷ .............................................. C08G 18/28
(52) U.S. Cl. ...................... 525/452; 524/507; 524/589; 524/591; 524/839; 525/124; 525/127; 525/128; 525/452; 525/453; 525/454; 525/455; 525/457; 525/458; 528/45; 528/52
(58) Field of Search ................................. 525/124, 127, 525/128, 452, 453, 454, 455, 457, 458; 524/507, 589, 591, 839; 528/45, 52

(56) References Cited

U.S. PATENT DOCUMENTS

| 4,610,927 A | 9/1986 | Igarashi et al. |
| 4,716,182 A | 12/1987 | Hess et al. |
| 5,159,011 A | 10/1992 | Rau et al. |

FOREIGN PATENT DOCUMENTS

| EP | 0417540 | 3/1991 |
| EP | 0131903 | 1/1995 |

*Primary Examiner*—John M. Cooney, Jr.
(74) *Attorney, Agent, or Firm*—Shoemaker and Mattare

(57) ABSTRACT

The invention relates to methods for producing storage-stable, latent-reactive layers and powders of surface-deactivated, solid polyisocyanates and dispersions or aqueous solutions of isocyanate reactive polymers, which can be used as adhesives and coverings. Said dispersions, suspensions or aqueous solutions can applied to a substrate in an appropriate form. Water can then be eliminated at a temperature inferior to the reaction temperature of the isocyanates and this operation can take place at a temperature above the softening temperature of the polymers. This process produces, at ambient temperature, dry and substantially water free layers which are storage stable and can react with the polymers at the polyisocyanate reaction temperature. The influence of temperatures above the reaction temperature of the surface-deactivated, solid polyisocyanates results in production of layers which are cross-linked to the functional groups of the polymer through reactions, said layers displaying high heat-resistance, and high chemical storage stability. These latent-reactive products in layer or powder form can be used for manufacturing glued assemblies and coverings.

9 Claims, No Drawings

METHOD FOR PRODUCING AND USING STORAGE-STABLE, LATENT-REACTIVE LAYERS OR POWDERS OF SURFACE-DEACTIVATED, SOLID POLYISOCYANATES AND DISPERSION POLYMERS WITH FUNCTIONAL GROUPS

This application is a continuation of U.S. Ser. No. 09/581,139, filed Jun. 9, 2000, which is now U.S. Pat. No. 6,348,548.

Method for producing and using storage-stable, latent-reactive layers or powders of surface-deactivated, solid polyisocyanates and dispersion polymers with functional groups.

The invention relates to a method for manufacturing and the use of storage-stable, latent-reactive layers and powders of essentially aqueous dispersions, suspensions or solutions which contain surface-deactivated polyisocyanates and isocyanate-reactive polymers.

JP 09 188, 735 describes a mixture, storage-stable at room temperature, of dispersed functional polymers with a polyisocyanate. A predispersion consisting of polyisocyanate, of polymer stabilizer and of a hydrophobic fluid (as a dispersion agent) is emulsified in a further aqueous solution or dispersion of an isocyanate-reactive polymer with the aid of an o/w emulsifier and protective colloid. After the application and the evaporation of the water the polyisocyanate reacts spontaneously under cross-linking with the functional groups of the polymer.

In DE 31 12 054, DE 32 28 723 and DE 32 28 724 powder-like, fine-particled, solid polyisocyanates with particle diameters up to 150 $\mu$m are surface-deactivated. By way of the surface coating the polyisocyanates retain their isocyanate content and their reactivity, and form a stable single component system also in water or aqueous solvents.

In DE 32 28 724 and DE 32 30 757 surface-deactivated, powder-like diisocyanates with polyols and aqueous dispersion polymers which contain functional groups are combined to a storage-stable reactive paste. By heating this water-containing paste to 140° C., i.e. above the reaction temperature of the polyisocyanate, the two components cross-link and a slightly foamed elastic coating is obtained.

A method for manufacturing stable dispersions of fine-particled surface-deactivated isocyanate is described in DE 35 17 333. The resulting stable dispersions are suitable as cross-linking agents.

A use of the aqueous dispersions of surface-deactivated, solid, fine-particled polyisocyanates as cross-linkers in textile pigment printing pastes and liquors is disclosed in DE 35 29 530. Subsequent to the application procedure the textile pigment, printing pastes and liquors are fixed on the tissue with hot air or steam.

A disadvantage of these systems described in these documents is however that the working steps of application and curing or cross-linking may not be separated, which would appear to be desirable with a multitude of uses for economical reasons as well as logistical reasons.

Thus a substrate which carries a storage-stable, latent-reactive layer or powder would open the possibility of being deposited at the location at which the suitable apparatus are present, of being stored for a predeterminable time duration and subsequently of being transported to the location at which the processing into further intermediate products or into the end product is effected.

Storage-stable, latent-reactive masses or layers are described in WO 93/25599. These consists of isocyanate-functional polymers which have a melting point of over 40° C. and of surface-deactivated polyisocyanates. For manufacturing the mixture, the components are melted on at temperatures which lie considerably above the softening point of the polymer. The expense with regard to the apparatus for the manufacture and the application of these masses, together with the energy costs are considerable. Furthermore in these systems for reasons of stability and processing only surface-deactivated polyisocyanates may be used which have a cross-linking temperature of over 80° C. Furthermore a directed and controlled inhomogeneous mixing of the components is the subject-matter of the application. This however demands complicated working steps.

It is the object of the present invention to manufacture storage-stable, latent-reactive, largely dry layers or powder with which also deactivated polyisocyanates with reaction temperatures below 80° C. may be applied, which from the point of view of environment protection behave advantageously and additionally may be inexpensively produced.

According to the invention this is achieved by the characterising part of the independent claims.

Storage-stable, latent-reactive layers or powder may accordingly be manufactured by the use of an essentially aqueous dispersion which contains at least one surface-deactivated polyisocyanate and at least one dispersed or dissolved polymer reactive with isocyanate.

Furthermore a method for the manufacture of storage-stable, latent-reactive layers or powders is the subject-matter of the invention, in which a) an essentially aqueous dispersion or solution of at least one polymer reactive with respect to isocyanates and b) at least one surface-deactivated, solid, fine-particled polyisocyanate essentially suspended in water are mixed, c) this mixture selectively is deposited onto a substrate in a predeterminable layer thickness and d) the water of the mixture is removed below the reaction temperature of the isocyanate, so that the essentially dry and water-free layers or masses obtained by way of this, at reaction temperatures below the reaction temperature of polyisocyanate and polymer are storage-stable and latent-reactive.

Surprisingly it has been found out that the removal of the water and the drying of the mixture in the temperature region selectively may be effected at i) room temperature up to the softening temperature of the functional polymer or ii) above the softening temperature of the polymer as long as the reaction temperature of the surface-deactivated polyisocyanate in none of the two case is exceeded. Independently of whether the drying is effected after i) or ii) the surface-deactivated solid, fine-particled polyisocyanates after the drying are distributed or embedded unchanged and unreacted in the largely water-free polymer or in the essentially water-free layer or powder. The dispersion, suspension or solution of polymer and suspended deactivated isocyanate blends into a continuous phase of uncross-linked polmers in which the unreacted surface-deactivated, fine-particled isocyanates are suspended.

In the case i) there results a water-free, dry, latent-reactive film or a latent-reactive powder, which at room temperature or at a slightly increased temperature is capable of storage. The ability of the surface-deactivated isocyanates to react with the functional groups of the polymers remains.

In the case ii) after the vapourisation of the water there results a melted system. As an example there serves the adhesing of a laminate of foils. Also in this phase the surface-deactivated isocyanates are unchanged and retain their reactivity. The adhesing is based firstly on the thermoplastic properties of the polymers.

In both cases the system cross-links and it becomes unmeltable and insoluble only on exceeding the reaction temperature of the surface-deactivated isocyanate. This is effected after a predeterminable time duration.

In certain cases a short-lived exceeding of the reaction temperature is sufficient in order to trigger the cross-linking reaction. The reaction or thickening temperatures of the deactivated polyisocyanates should with this have temperatures in the region of 30° C. to 180° C., preferably lie in the region between 40° C. and 150° C.

Thickening or reaction temperatures describe the temperature at which the surface-deactivating layer of the isocyanate dissolves or is destroyed in another manner. The polyisocyanate is set free and dissolved in the polymer. The end curing is effected by diffusion and reaction of the polyisocyanate with the functional groups of the polymer under a viscosity increase and cross-linking. The thickening and reaction temperature according to the type of surface-deactivated polyisocyanate lies above or below the softening temperature of the polymer.

The stability of the unreacted system, the reaction temperature and the course of the reaction are determined by the type of the polyisocyanate, by the type and the quantity of the surface stabiliser, by the solubility parameter of the functional polymer as well as by catalysers, softeners and other auxiliary means. These are largely described in the above mentioned patents.

Furthermore the processing steps of the substrate carrying the layer or the powder, subsequent to the application, are the subject-matter of the invention. These comprise steps as they are e.g. necessary for the processing of the substrate into its final form by punching, cutting, bending, folding, laminating, etc. With this furthermore it has been unexpectedly ascertained that the film or powder according to the invention may be processed in their plastic condition. Even after days and months the layer or the powder may be heated to temperatures above the softening temperature of the polymer without there arising a reaction between the functional groups- of the polymers and the surface-deactivated isocyanates. The processing in the plastic condition may with this even be effected under a frequent heating and cooling.

In a preferred embodiment form the films or powders are storage-stable, latent-reactive adhesive systems.

As polyisocyanates for the method according to the invention all diisocyanates or polyisocyanates or their mixtures are suitable as long as they have a melting point above 40° C. and by way of known methods may be conveyed into powder form with particle sizes below 200 µm. They may be aliphatic, cycloaliphatic, heterocylic or aromatic polyisocyanates. As examples there are mentioned: diphenyl methane-4,4'-diisocyanate (MDI), dimeric 4,4'-MDI, napthalene-l,5-diisocyanate (NDI), 3,31-dimeythyl-biphenyl-4,41-diisocyanate (TODI), dimeric 1-methyl-2,4-phenyl-4,4'-diisocyanate. (TDI-U), 3,3'-diisocyanate-4,4'-dimethyl-N, N'-diphenyl urea (TDIH), addition product of 2 moles of 1-methyl-2,4-phenylene-diisocyanate with 1 mole of 1,2-ethandiol or 1,4-butandiol, addition product of 2 moles of MDI to 1 mole of diethylene glycol, the isocyanurate of isophoron diisoccyanate (IPDI-T).

The mentioned addition products do not only show advantages according to the invention as aqueous dispersions. Addition products of 1-methyl-2,4-phenylene-diisocyanate and 1,4 butandiol or 1,2 ethandiol also in solid or liquid solvent-containing or solvent-free systems have very advantageous properties. They characterise themselves above all with regard to their low curing or cross-linking temperature which lies in the temperature region below 90° C. Thus the use of this mixture whether largely based on water or polyol is very advantageous for coatings and adhesings of temperature-sensitive substrates.

The surface stabilising reaction may be carried out in various ways:
  by dispersion of the powder-like isocyanate in a solution of the deactivating agent.
  by furnishing a molten mass of a low-melting polyisocyanate into a solution of the deactivating agent in a non-dissolving liquid dispersion agent
  by adding the deactivating agent or a solution thereof, for dispersion of the solid fine-particled isocyanate.

The solid polyisocyanates are preferably deactivated by the action of primary and secondary aliphatic amines, diamines or polyamines, hydrazine derivatives, amidines, guanidines. To have proven themselves are ethylene diamine, 1,3-propylene-diamine, diethylene triamine, triethylene tetramine, 2,5-dimethyl-piperazine, 3,3'-dimethyl-4, 4'-diamino-dicyloheyl methane, methyl nonane-diamine, isophoron diamine, 4,4'-diaminodicyclohexyl methane, diamino and triamino polypropylene ether, polyamido amine, and mixures of monoamines, diamines and polyamines.

The concentration of the deactivating agent should be 0.1 to 25, preferably 0.5 to 8 equivalent percent, with respect to the total present isocyanate groups.

Often for the application according to the invention the particle size of the powder-like polyisocyanates by way of a fine dispersion or wet grinding subsequent to the synthesis must be brought to a particle size in the region of 0.5 to 20 µm. For this, dissolvers, dispersion apparatus of the rotor-stator type, stirring ball mills, bead and sand mills, ball mills and friction gap mills are suitable, at temperatures below 40° C. According to the polyisocyanate and the use, the comminution is effected on the deactivated polyisocyanate, in the presence of the deactivating agent, in the non-reactive dispersion agent or water with a subsequent deactivation. The ground and surface-stabilised polyisocyanate may also be separated from the grinding dispersions and dried.

In order to control the surface deactivation and the cross-linking reaction, also catalysers may be added. Preferred are those catalysers which in aqueous solution or dispersion are hydrolysis-stable and then later also accelerate the heat-activated reaction. Examples for urethane catalysers are organic tin, iron, lead, cobalt, bismuth, antimony and zinc compounds or their mixtures. Alkylmer captide compounds of dibutyl tin are preferred on account of the higher hydrolysis stability.

Tertiary amines such as dimeythlybenzyl amine, diazabicyclo-undecen, as well as non-volatile polyurethane foam catalysers based on tertiary amine may be used for special purposes or in combination with metal catalysers, the catalytic activity may however be restricted by conversion with the carbon dioxide of the air.

The concentration of the catalysers lies in the region of 0.001 to 3%, preferably 0.01% to 1% with respect to the reactive system.

As a reaction partner, according to the invention, of the polyisocyanate, there are considered water-soluble or water-dispersable emulsion polymers or dispersion polymers, which carry isocyanate-reactive functional groups. These are manufactured according to the state of the art by polymerisation of olefinic unsaturated monomers in solution, emulsion or suspension. The film-forming polymerisates contain 0.2 to 15%, preferably 1. to 8 % polymerised-in monomer with isocyanate-reactive groups such as hydroxyl, amino, carboxyl and carbon amide groups.

Examples of functional monomers are: allyl alcohol, hyroxyethyl or hydroxypropyl acrylate and methacrylate, butandiol monoacrylate and methacrylate, ethoxylated or propoxylated acrylates or methacrylates, N-methylol-acrylamide, tert. butylamino-ethyl-methacrylate, acrylic and methacrylic acid, maleic acid, maleic acid monoester. Also glycidyl methacrylate and allylglycidyl ether may be copolymerised. These contain an epoxy group which in a further step with amines or amine alcohols are derivatised to the secondary amine, for example with ethyl amine, ethyl hexylamine, isononyl amine, aniline, toluidine, xylidine, benzyl amine, ethanol amine, 3-amino-1-propanol, 1-amino-2-propanol, 5-amino-1-pentanol, 6-amino-1-hexanol, 2-(2-aminoethoxy) ethanol, also copolymerised acetylacetoxy ethyl methacrylate and acrylate may take part in addition reactions with the mentioned primary amines. The conversion with primary amines increases the reactivity of the functional groups of the polymers with respect to the isocyanate groups at the expense of the side-reaction with water.

Suitable are also water-soluble hydroxyfunctional binders such as polyvinyl alcohol, part saponified polyvinyl acetate, hydroxyethyl cellulose, hydroxypropyl cellulose as well as water-dispersable hydroxy-functional polyester, hydroxyfunctional sulfopolyester and polyurethane dispersions, dispersions of polyamido amines which carry carboxyl, hydroxyl, primary or secondary amino groups. Likewise aqueous colloidal dispersions or colloidal solutions with particle sizes between 1–100 nm may be manufactured in colloid mills, proceeding from thermoplastic polymers with isocyanate-reactive groups. Examples are higher molecular solid epoxy resins, polyethylene vinyl alcohol and polyethylene co-acrylic acid.

The ratio between the isocyanate groups in the surface-stabilised fine-particled polyisocyanates and the sum of the hdroxyl and amino groups of the polymers in the largely water-free and solid condition should be in the range of 0.1 to 1.5.

Into the resulting highly viscous paste or low viscosity mixture there may be mixed or dispersed inert or functional additions. To the functional additions there belongs hdroxyl functional or amino functional powder-like or liquid, low to high molecular compounds which may react with the solid polyisocyanates above the reaction temperature. The stochiometric ratios are to be correspondingly adapted. Low molecular compounds are to be understood as compounds with molecular weights between 40 and 500 g/mole, and high molecular compounds as those whose molecular weights lie between 5000 and 10000 g/mol. As examples there may be cited: low molecular to high molecular liquid polyols or/and polyamines, solid polyfunctional polyols or/and aromatic polyamines. Examples are triethanol amine, butandiol, trimethylol propane, ethoxylated bisphenol A, terminally ethoxylated polypropylene glycols, 3,5-diethyl-toluylene-2,4-and 2-6-diamine, poly-tetramethyl oxide-di-(p-aminobenzoate), tris-hydroxyethyl-isocyanurate, hydroquinone-bis-hydroxyethyl ether, pentaerythrite, 4, 41-diamino-benzanilide, 4,4'-methylene-bis-(2,6-diethyl aniline).

To the inert additions there belongs for example surface-active agents, organic or anorganic thickening agents, softeners, fillers, plastic powder, pigments, colours, light stabilisers, ageing stabilisers, biocides, defoaming agents, corrosion protection agents, flame proofing agents, sponging agents, adhesing resins, organo-functional silanes, short cut fibres and where appropriate small quantities of inert solvents.

The advantages of the present invention lie in the separation of the application of the aqueous dispersion from the cross-linking reaction, i.e. the final curing. Thus e.g. at one location adhesive films may be deposited onto wood, glass or other types of substrates or underlays at one location, these premanufactured fabrications may be stored or transported and be cured to the end product at another location.

A further advantage of the method according to the invention and the use of the corresponding products lies in the use of water as a dispersion medium. The energy consumption for manufacturing the dispersions is small. The component part of organic solvent is minimal which results in a processing which is very advantageous for the environment.

If one proceeds from an aqueous polymer dispersion a further advantage lies in the fact that also surface-deactivated polyisocyanates with a melting point in the region of 40 to 150° C. may be worked in without any problem. The cross-linking temperatures may lie in the region of 35° C. to 90° C. With these low cross-linking temperatures also temperature-sensitive substrates may be adhesed to this one-component system by the heat effect.

The layer or powder obtained from the aqueous suspension, dispersion or solution may be stored for months. According to the dissolving properties of the solid film for the polyisocyanate, the storage duration at room temperature or slightly increased temperatures is however different. The storage duration of the system according to the invention in the water-free and uncross-linked condition is at least 3 times, usually more than 10 times that of the same mixture with the same polyisocyanates which are not surface-deactivated. At +2° C. the layers or powder according to the invention are storage-stable for at least six months, at room temperature however at least 1 month storage-stable and according to the invention are capable of being processed. The term latent-reactive describes the condition of the essentially water-free layer or powder in which the surface-deactivated polyisocyanate and the polymer reactive with isocyanates are present in the essentially uncross-linked condition.

The heat supply for the thermoplastic processing as well as the cross-linking may preferably be effected with convection or irradiation heat. The storage-stable aqueous suspension, dispersion or solution of surface-deactivated fine-particled polyisocyanates and dispersed or water-soluble polymers with isocyanate groups may be applied to the surface of the substrate to be adhesed or coated, in particular by brushing, spraying, injecting, doctoring, pasting, casting, submersing, extruding or by roller depositing or with the printing method.

In the case of the adhesing of substrates one may selectively proceed as follows:

1. Press adhesing by joining the adhesing surfaces at room temperature and increasing the temperature up to over the softening temperature of the polymer, but below the reaction temperature, then cooling to room temperature. There arises a compound which is latent-reactive. This compound may be processed further and formed also in the plastic or thermoplastic region of the polymer. The adhesing obtains the final cross-linked condition when the temperature is increased to above the thickening or reaction temperature.

2. Press adhesing by joining the adhesing surfaces at room temperature and increasing the temperature up to over the softening temperature of the polymer, forming a homogeneous adhesive film which covers and adheses the counter-surface, increasing the temperature until above the thickening or reaction temperature and final cross-linking.

3. The coated adhesive surface is brought into the thermoplastic condition by increasing the temperature until over the softening temperature of the polymer, is joined to a second substrate and under pressing, the temperature is increased up to above the thickening or reaction temperature. Where appropriate in the thermoplastic condition of the system further processing steps may be carried out.

In a second embodiment form of the method the storage-stable, aqueous dispersion of surface-deactivated, fine-particled polyisocyanates and dispersed or water-soluble polymers with isocyanate-reactive groups is brought into the form of a latent-reactive adhesive film, adhesive tape, adhesive fleece or tissue which may build up adhesion on both sides. For manufacturing substrate-free forms, such as films or tapes, the dispersion according to the invention is applied onto a non-adhesing substrate tape or separating paper and the water at room temperature or at room temperatures up to the softening point of the polymer is volatised. The adhesive film may after cooling be released from the substrate and up to its use may be stored free of substrate. Alternatively the adhesive film may be stored together with the substrate paper.

In the case of the adhesive fleeces or tissue the reaction-capable dispersion is applied by spraying, injecting, doctoring, casting, submersing, padding, by roller application or with the printing method, the water at room temperature or at temperatures up to the softening temperature of the polymer is volatised, and the adhesive fleece or tissue, provided or impregnated with the latent heat-reactive adhesive layer, is stored up to its use.

The substrate-free adhesive films, adhesive tapes, adhesive fleeces or tissue serve as an adhesive layer between substrates. It is also possible to deposit or sinter adhesive films, fleeces or tissues on one side onto a substrate surface in the plastic condition. This laminate may up to the final adhesing to a second substrate surface be stored at room temperature.

In a third embodiment form of the method the storage-stable, aqueous dispersion of surface-deactivated, fine-particled polyisocyanates and dispersed or water-soluble polymers with isocyanate-reactive groups is brought into the form of a latent-reactive powder. These powders may be used as latent-reactive adhesives or for coating purposes, such as powder varnish.

For manufacturing powders from the dispersions according to the invention these may be sprayed in a spraying tower, the temperature of the air indroduced from below should remain below the softening temperature of the polymer and the reaction temperature of the surface-blocked polyisocynate.

Alternatively the dispersions according to the invention may be sprayed onto the non-adhesing surface of a revolving tape with dehesive surfaces or be applied with a printing method. After the volatisation of the water the dry particles are scraped from the tape, where apppropriate sieved or graded, and stored until use.

Latent reactive powders may also be manufactured of substrate-free films or tapes by grinding processes, where appropriate at low temperatures. They serve as heat-reactive, cross-linkable adhesive powder or as coating powder. Application apparatus and methods belong to the state of the art and are known to the man skilled in the art.

The latent-reactive premanufactured layers manufactured according to the invention preferably serve as a thermally burdenable adhesive connection for flexible or solid substrates such as metals, plastics, glass, wood, wood compound material, cardboard, foils, synthetic surface webs, textiles.

The reactive coating powder manufactured according to the invention may also be processed with the application methods for powder lacquers. The cross-linking temperature may be so low, according to the selection of the polyisocyanate, that heat-sensitive substrates, such a plastics, textiles and wood may be coated without thermal damage.

The method permits also the coating powder on the substrate to only be sintered or melted to a closed layer. The complete cross-linking is effected then with a later heat treatment, where appropriate after an additional mechanical or thermal processing step.

EXAMPLES

A) Application and testing method, storages:

Storage A Application of dispersions at room temperature, extensive removal of the water by vapourisation at room temperature and/or penetration into the underlay, after max. 3 hours joining the adhesive surfaces, storage under normal conditions for minimally 7 days, then for 0.5 hours heating to 120° C. (object temperature), wherein the cross-linking reaction is triggered. Cooling and storage for 24 hours under normal conditions.

Storage B As storage A, but without heat treatment.

Storage C Depositing onto adhesive surface, extensive removal of the water by vapourisation at room temperature and/or penetration into the underlay. Letting the surface provided with the adhesive layer dry for at least 30 days open to the air. Joining the adhesive surfaces and under clamping pressure, heating to 120° C. for 0.5 hrs, wherein the cross-linking reaction is triggered. Cooling and storage for 24 hrs under normal conditions.

Storage D Storing the fluid dispersion for 30 days at room temperature then applying to the adhesive surface. Further as with the storage A or C.

Testing the temperature stability or heat stability of the adhesings: test pieces with $100 \times 20 \times 5$ mm$^3$ of beech wood or $25 \times 100 \times d$ mm$^3$ of synthetic material were simply press adhesed in an overlapping manner, overlapping 10 mm, adhesive surface $20 \times 10$ mm$^2$. In order with the hot-adhesing to exclude as much as possible of the side reactions of water with isocyanates the wood test-pieces were heated in a circulation oven under a vacuum (residual pressure 0.1 bar) for 0.5 hours to 120° C.

For determining the heat stability after storages A and C the test-pieces were hung perpendicularly in the circulation oven and loaded on one side with 3000 g. The temperature was increased by 10° C. every 15 minutes. Stability losses of the adhesions led to the falling of the weights. The upper testing temperature was limited to 150° C.

Determining the water resistance: storage of test pieces in water at normal temperature for 4 days. Qualitative assessment of the strength in the wet condition. The following are:

| | |
|---|---|
| high and practically unchanged stability of the adhesing | + |
| noticable fall in stability | +/− |
| Loss in stability or falling apart of the adhesing | − |

Deviating or other test conditions or tests are indicated in each case. Abbreviation SDSI: surface deactivate solid isocyanate B) Manufacture of the aqueous suspension from solid surface-deactivated polyisocyanate: general regulation With the dissolver the following suspensions of surface-deactivated polyisocynates were manufactured:

|  | parts by weight |
|---|---|
| (1) water | 106 |
| (2) Kelzan S, 3% solution in water (Mosanto) | 33 |
| (3) polyoxyethylene sorbite antriolate | 1 |
| (4) polyamine | 2–6 |
| (5) polyisocyanate powder, particle size < 45 $\mu$m | 80 |
|  | 222–226 |

(4) polyamine Euretek 505 (Witco) polyamido amine Jeffamine T-403 (Huntsman) aminoterminated polyoxy propylene

| Specific examples | grams per equivalent | grams of originally weighted to quantity | % isocyanate groups deactivated |
|---|---|---|---|
| Example 1 | | | |
| (1) (2) (3) components as above | | | |
| (4) polyamido amine Euretek 505 | 144 | 2.3 | 5.0 |
| (5) IPDI-isocyanurate (IPDI-T) polyisocyanate IPDI-T 1890/100 Huels | 243 | 80 | |
| Example 2 | | | |
| (1) (2) (3) components as above | | | |
| (4) Jeffamine T-403 (Huntsman) | 143 | 6 | |
| (5) 4,4-diphenyl methane diisocyanate (MDI) | 125 | 80 | 6.6 |

The surface-deactivated MDI by way of half an hour of grinding this suspension in a cooled open bead mill (glass beads 1 mm, 2500 revolutions per minute) was reduced in size to an average particle size of 15 $\mu$m.

| | grams per equivalent | grams of originally weighted in quantity | % isocyanate groups deactivated |
|---|---|---|---|
| Example 3 | | | |
| (1) (2) (3) components as above | | | |
| (4) polyamido amine Euretek 505 | 144 | 3.7 | 5.0 |
| (5) 3,3'-dimethyl-biphenyl-4,4'-diisocyanate (TODI) | 132 | 80 | |
| Example 4 | | | |
| (1) (2) (3) components as above | | | |
| (4) polyamido amine Euretek 505 or Jeffamine T-403 | 144 | 3.3 | 5.0 |
| (5) dimeric 1-methyl-2,4-phenylene diisocyanate (TDI-U) | 174 | 80 | |
| Example 5 | | | |
| (1) (2) (3) components as above | | | |
| (4) polyamido amine Euretek 505 | 144 | 3.3 | 5.8 |
| (5) urethane of 2 moles of 1-methyl-2,4-phenylene and 1 mol of 1,2-ethylene glycol (TDIxEG) | 205 | 80 | |
| Example 6 | | | |
| (1) (2) (3) components as above | | | |
| (4) polyamido amine Euretek 505 | 144 | 3.3 | 6.3 |
| (5) urethane of 2 mols of 1-methyl-214-phenylene and 1 mol of 1,4 butandiol (TDIxBDO) | 219 | 80 | |
| Comparative example 7 | | | |
| (5) Desmodur DA | 215 | trimerised hexa-methylene diisocyanate emulsifiable approx. 19.5% NCO | |

C Application and testing the reactive adhesive dispersions Used adhesive dispersions: Jagotex KEM, Ernst Jaeger GmbH, D-Duesseldorf: Vinyl acetate-(meth)acrylate dispersion, with hydroxyl groups in polymer and in protective colloid, 55% solid matter, contact adhesive with activation temperature 60–80° C. Neutralised with ammonia. Dispercoll U 54, Bayer AG D-Leverkusen: PUR-dispersion, aliphatic isocyanate, 50% solid matter, with isocyanate-reactive groups Manufacture of the adhesive dispersions. General regulation: With the dissolver a reactive dispersion adhesive was manufactured with the specified polyisocyanates as follows:

|  | parts by weight | part by weight per 100 polymer |
|---|---|---|
| (1) adhesive dispersion, approx. 50% solid matter | 100 | |
| (2) suspension of de-activated polyisocyanate approx. 35% | 16 | approx. 11.2 |
| (3) metatine catalyser 715; base dibutyltinalkylmercaptide (Acima AG, CH-Buchs) | 1 | approx. 0.2 |
| 10% diethylene glycol-dimetheylene ether | 117 | |

The adhesive mixtures were deposited onto the adhesive surfaces of beech wood test pieces with a spiral doctor blade, then treated according to storages A–C, then tested as specified. The deposition weight was after the drying about 100 g/m$^2$.

EXAMPLES 8 to 12

Cross-linking tests with adhesives based on KEM 2010 (neutralised) and various suspensions of polyisocyanates

|  | Comparative Example 8 | Comparative Example 9 | Example 10 | Example 11 | Example 12 |
|---|---|---|---|---|---|
| dispersion adhesive with SDSI suspension (obs. 1) | without SDSI | Desmodur DA (obs. 2) | IPDI-T Susp. according to Example 1 | MDI Susp. according to Example 2 | TODI Susp. according to Example 3 |
| Storage A: 30 min/120° C. |  |  |  |  |  |
| heat stability ° C. | 85 | >150 | >150 | >150 | >150 |
| water storage | — | — | — | + | + |
| Storage B: normal conditions |  |  |  |  |  |
| heat stability ° C. | 55 | >130 | 55 | 55 | 55 |
| water storage | — | — | * | * | * |
| Storage C.: 1 month open, joining, then 30 min/120° C. |  |  |  |  |  |
| heat stability ° C. | 55 | no contact adhesing | >150 +/− | >150 + | >150 + |
| water storage | — |  |  |  |  |
| dispersion adhesive with SDSI-suspension (obs. 1) | without SDSI | Desmodur DA (obs. 2) | IPDI-T Susp. according to Example 1 | MDI Susp. according to Example 2 | TODI Susp. according to Example 3 |
| Storage D: 1 month fluid at normal conditions, then storage A |  |  |  |  |  |
| heat stability ° C. | * | 85 | * | >150 | * |
| water storage | * | — | * | + | * |

*not tested
obs. 1: SDSI approx 11.2 parts per 100 parts solid polymer
obs. 2: 13 parts Desmodur DA per 100 parts solid polymer

EXAMPLES 13 to 16

Cross-linking tests with adhesives based on KEM 2010 (neutralised) and various suspensions of polyisocyanates

|  | Example 13 | Example 14 | Example 15 | Example 16 |
|---|---|---|---|---|
| dispersion adhesive with SDSI suspensions (obs. 1) | TDI-U Susp. according to Example 4 | TDIxEG Susp. according to Example 5 | TDIxEG Susp. according to Example 5 one-sided depositing | TDIxBDO Susp. according to Example 6 |
| Storage A: 30 min/120° C. |  |  |  |  |
| heat stability ° C. | >150 | >150 | >150 | >150 |
| water storage | + | + | + | + |
| Storage B: normal conditions |  |  |  |  |
| heat stability ° C. | 55 | 50 | * | * |
| water storage | * | * | * | * |
| Storage C.: 1 month open, joining, then |  |  |  |  |
| 30 min/120° C. |  |  |  |  |
| heat stability ° C. | >150 | >150 | >150 | >150 |
| Storage D: 1 month fluid at normal conditions, then storage A |  |  |  |  |
| heat stability ° C. | >150 | * | * | * |
| water storage | + | * | * | * |

*not tested
obs. 1: SDSI approx 11.2 parts per 100 parts solid polymer

EXAMPLES 17 to 21

Cross-linking tests with adhesives based on polyurethane dispersion Dispercoll U 54 and various suspensions of polyisocyanates

|  | Comparative Example 17 | Comparative Example 18 | Example 19 | Example 20 | Example 21 |
|---|---|---|---|---|---|
| dispersion adhesive with SDSI suspensions (obs. 1) | without SDSI | Desmodur DA (obs. 2) | IPDI-T Susp. according to Example 1 | TDI Susp. according to Example 4 | TDIxEG Susp. according to Example 5 |
| Storage A: 30 min/120° C. |  |  |  |  |  |
| heat stability ° C. | 120 | >150 | >150 | >150 | >150 |
| water storage | +/− | + | + | + | + |
| Storage B: normal conditions |  |  |  |  |  |
| heat stability ° C. | 100 | >150 | * | * | * |
| water storage | +/− | + | * | * | * |
| Storage C: 1 month open, joining, then 30 min/120° C. |  |  |  |  |  |
| heat stability ° C. | 120 | no contact adhesing | >150 | >150 | >150 |

*not tested
obs. 1: SDSI approx 11.2 parts per 100 parts solid polymer
obs. 2: 13 parts Desmodur DA per 100 parts solid polymer

EXAMPLES 22 to 24

Manufacturing a thermoreactive adhesive fleece

The adhesive dispersions were deposited with a spiral doctor blade onto textile fleeces of polyethylene terephtalate (Lutradur 7225, surface weight 25 g/m², Freudenberg KG, D-Weinheim). The fleeces in the fresh condition are separated from the underlay and dried hanging perpendicularly under normal conditions.

After a 10 day storage duration the dry fleeces between two beech woods of 5 mm thickness under a mechanical pressure of 2 kp/m² were heated for 30 minutes to 120° C. (press adhesing). The bond was subsequently stored for 24 hours without pressure at normal conditions. The following properties were determined of the test pieces:

|  | Example 22 | Example 23 | Example 24 |
|---|---|---|---|
| Adhesive according to example | 13 | 13 | 16 |
| with polymer | KEM 2010 | KEM 2010 | KEM 2010 |
| SDSI short description | TDI-U | TDI-U | TDIxBDO |
| deposition weight dry, g/m$^2$ | 88 | 25 | 34 |
| heat stability of the adhesive joints ° C. | >150 | >150 | >150 |

EXAMPLE 25

Example 22 was repeated analogously, wherein textile fleeces were done away with. There arose on silicone paper a complete substrate-free, solid adhesive layer which after separation from the silicone paper and press-adhesing was cross-linked at 120° C. With a testing of the heat stability it showed the values analogous to Example 22.

EXAMPLE 26

Adhesing of glass-fibre-reinforced polyester test pieces

The reactive adhesive dispersion according to Example 14 was applied onto test pieces with the dimensions 100×25×3 mm$^3$, dry weight appprox. 100 g/m$^2$. After volatisation of the water the test peieces were stored for 3 days at normal conditions. The coated surface was heated to 80° C. (this means just over the softening point of the polymer) and a simple overlapping press adhesing, adhesive surface 200 mm$^2$ was produced. Immediately the temperature was increased to 120° C. and kept for 30 minutes. At this temperature the cross-linking was effected. Subsequently storage for 24 hours under normal conditions. There were evaluated

| tensile shear strength (100 mm per minute tensile speed): | 2.21 MPa |
|---|---|
| heat stability | >150° C. |

EXAMPLE 27

An adhesive composition was manufactured analogously to Example 13 and the aqueous dispersion deposited at room temperature. The removal of the water was effected by vapourisation at room temperature and/or penetration into the underlay. The solid layer was left lying open over a period of time of 5 months at +20° C. The adhesive surfaces were thereafter joined together and under clamping pressure heated to 120° C. for 0.5 hours, wherein the cross-linking reaction was triggered. Subsequently there was effected a 24 hour storage at room temperature. The results with regard to heat stability and water storage corresponded to those in Example 13.

EXAMPLE 28

Manufacture, application and storage effected analogously to Example 26. Thereafter the whole system consisting of the underlay and solid adhesive layer was heated three times to 80° C over the softening point of the polymer and again cooled. Subsequently there was effected the curing by way of heating for half an hour to 120° C. The results with regard to heat stability and water storage corresponded to those in Example 13.

EXAMPLE 29

An aqueous dispersion which corresponded to the composition of Example 13 was conveyed by way of spray drying into a solid largely water-free powder. The application, storage and cross-linking was effected analogously to Storage C. The results with regard to heat stability and water storage corresponded to those in Example 13.

What is claimed is:

1. An aqueous dispersion comprising
   at least one surface-deactivated solid polyisocyanate and
   at least one polymer reactive with isocyanate,
   wherein the polymer reactive with isocyanate is selected from the group consisting of film-forming polymerizates, and which after drying of the dispersion below the reaction temperature of the surface deactivated polyisocyanate allows the formation of a solid film which has an activation temperature from about 55° C. to about 85° C.

2. An aqueous dispersion according to claim 1, wherein the polymer reactive with isocyanate is selected from the group consisting of co-polymerizates of glycidylmethacrylate and allylglycidylether, the epoxy group of which has been converted with amines or amino alcohols to a secondary amine.

3. An aqueous dispersion according to claim 1, wherein the polymer reactive with isocyanate is selected from the group consisting of polyvinylalcohol, partially saponified polyvinylacetate, hydroxyethlycellulose, water-dispersible hydroxy functional polyester, hydroxy functional sulfopolyester, dispersible polyamidoamines having carboxyl and hydroxyl and/or primary or secondary amino groups, and polyurethanes.

4. An aqueous dispersion according to claim 3, wherein the polyurethane is Dispercoll® U 54 manufactured from aliphatic isocyanate.

5. An aqueous dispersion according to claim 1, wherein the polyisocyanate has a melting point in the range of 40° C. to 150° C.

6. An aqueous dispersion according to claim 1, wherein the polyisocyanate has a particle size of from 0.5 μm to 20 μm.

7. An aqueous dispersion according to claim 1, wherein the poly-isocyanate is diphenylmethane-4,4'-diisocyanate having a particle size below 5 μm.

8. An aqueous dispersion according to claim 1, wherein the polyisocyanate is selected from the group consisting of diphenylmethane-4,4'-diisocyanate, naphthalin-1,5-diisocyanate, 3,3'-diinethy-biphenyl-4,4'-diisocyanate, dimeric 1-methyl-2,4-phenylene-diisocyanate, 3,3'-diisocyanato-4,4'-dimethyl-N,N'-diphenyl urea, and isocyanurate of isophorondiisocyanate.

9. An aqueous dispersion according to claim 1, wherein the polymer reactive with isocyanate is a film-forming polyurethane and the polyisocyanate is selected from the group consisting of diphenylmethane-4,4'-diisocyanate, 3,3'-diisocyanato-4,4'-dimethyl-N,N'-diphenyl urea, dimeric 1-methyl-2,4-phenylene-diisocyanate, and isocyanurate of isophorondiisocyanate.

* * * * *